Aug. 6, 1968 A. WILLIAMS 3,395,604
PLASTIC FASTENER WITH ANNULAR REBATE PORTIONS
Filed Oct. 7, 1966
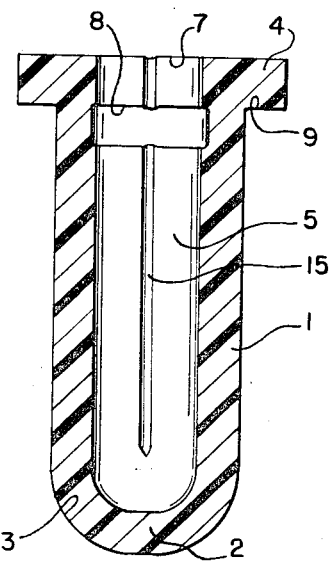
FIG. I
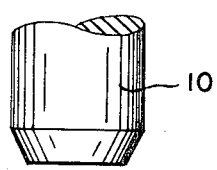
FIG. 2
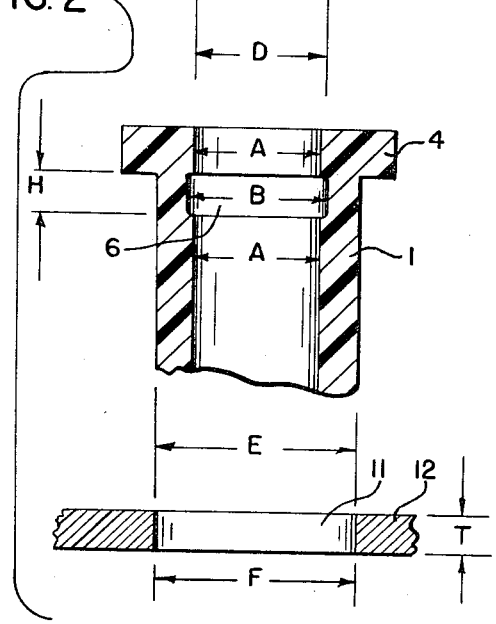
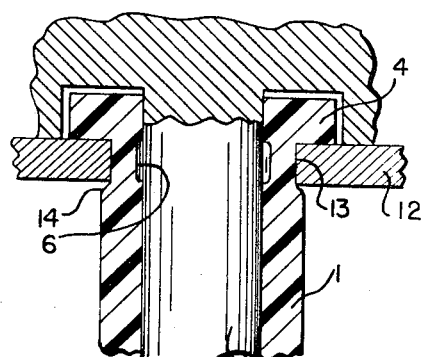
FIG. 3
INVENTOR
ALAN WILLIAMS
BY
Teare, Teare & Sammon
ATTORNEYS

United States Patent Office 3,395,604
Patented Aug. 6, 1968

3,395,604
PLASTIC FASTENER WITH ANNULAR
REBATE PORTIONS
Alan Williams, Cardiff, South Wales, assignor to Tinnerman Products, Inc., Cleveland, Ohio, a corporation of Ohio
Filed Oct. 7, 1966, Ser. No. 585,159
Claims priority, application Great Britain, Oct. 8, 1965, 42,883/65
7 Claims. (Cl. 85—82)

ABSTRACT OF THE DISCLOSURE

A fastening device adapted for fastening an article to an apertured panel and having a cylindrical body having a head disposed adjacent one end. A bore extends through the head into the body and is adapted to receive a stud member therein. The body has a rebate portion adjacent the head which has a reduced thickness which is adapted to be deformed to provide a shoulder on the body when the body is driven into an aperture in a panel and a stud is driven into the bore to retain the device in position in the panel.

---

The present invention relates to fastening devices for securing a stud member to an apertured panel, and a principal object of the invention is to provide a fastening device of this kind which will ensure that the member is kept firmly attached to the panel over a prolonged period of time.

The invention provides a fastening device for securing a stud member in an aperture in a panel, comprising a generally tubular body of deformable material having a head at one end for abutment against the panel around the aperture, and an internal annular rebate or groove of such dimensions and such disposition relatively to the head as to permit deformation of the wall of the rebate by the wall of the aperture when the body is inserted fully in the aperture to thereby form a shoulder on the side of the panel remote from the head to retain the device in position.

The tubular body may be closed at the end remote from the head so as to form a socket and is preferably made of a synthetic plastics material such as polyethylene or nylon.

The stud member may comprise an emblem, nameplate or the like provided with a projecting stud for engagement with the socket, or alternatively a simple stud may be used in conjunction with a further apertured panel or the like to retain two panels together.

In order that the invention may be clearly understood, one embodiment thereof will now be described by way of example only with reference to the accompanying drawing, in which:

FIG. 1 is a longitudinal section of an embodiment of fastening device according to the invention;

FIG. 2 is an exploded sectional view partially illustrating the device of FIG. 1 together with a stud member and an apertured panel, and FIG. 3 is a view showing the parts illustrated in FIG. 2 assembled together.

Referring now to FIG. 1, it will be seen that the fastening device comprises a tubular body in the general form of a socket which is manufactured from a synthetic resin such as polyethylene. The socket has a cylindrical body portion 1 which in this embodiment is closed at end 2, the periphery of the body portion being radiussed at 3 where it meets closed end 2 so as to facilitate easy entry of the fastening device into a panel aperture. At the opposite end, the socket is shaped to provide a flanged head 4.

The bore 5 of the socket 1 has an annular rebate 6 spaced from the end 7 thereof. The upper annular periphery 8 of the rebate is in substantial alignment with the underside 9 of the flanged head 4.

Referring now to FIG. 2, which shows a tubular element in conjunction with the parts with which it cooperates, the diameter A of the bore 5 is of a dimension so as to provide a tight push fit for a stud member 10. Similarly, the external diameter E of the socket 1 is of a dimension so as to provide a tight push to force fit in an aperture 11 of a panel member 12.

When the cylindrical body portion 1 is pushed or forced into the aperture 11 until it is fully home as shown in FIG. 3, the underside 9 of the flange 4 bears against the face of the panel 12 and the rebate 6 is substantially aligned with the plate 12.

Under these conditions limited deformation occurs in the material of the body portion 1 in the zone of the rebate 6. This is effective to cause necking of the material as shown at 13 in FIG. 3. A shoulder 14 of material thus forms on the side of the panel remote from the flange 4 which is effective to lock the socket in position.

Examples of the relative dimensions of the various parts for a one-eighth of an inch diameter stud are as follows:

|  | Inches |
|---|---|
| Stud diameter | 0.122–0.126 |
| Socket bore diameter | 0.120–0.122 |
| Groove diameter | 0.130–0.132 |
| Groove height | 0.038–0.043 |
| Panel thickness | 0.030–0.036 |
| Socket external diameter | 0.185–0.189 |
| Panel aperture diameter | 0.186–0.188 |

Consider now a combination of elements having the minimum and maximum dimensions underlined in the above table (i.e. the "worst" case).

Under these conditions:

(a) When the body 1 is inserted in the panel aperture 11, a constriction of 0.003 inch (0.189−0.186) will be caused in the wall of the rebate 6. The internal diameter of the rebate 6 will therefore be reduced to 0.127 inch (0.130−0.003).

(b) When the stud 10 is subsequently inserted, a clearance of 0.001 inch (0.127–0.126) will be maintained between the stud and the rebate wall. Binding between the stud and the body 1 cannot therefore take place.

Where the socket is provided with a closed end a vertical channel may be provided within the bore of the socket as shown at 15 in FIG. 1. The channel permits the escape of air which, in the absence of the channel, would be compressed in the enclosed space between the end of the stud and the bottom of the socket bore. There is a danger that this compressed air would exert a force urging the stud out of the socket, so that the device could not provide firm attachment of a stud member to a panel over a prolonged period of time.

Alternatively a vent may be provided near the bottom of the bore to permit the release of trapped air.

I claim:

1. A fastening device adapted for securing an article to an apertured panel, said device comprising a cylindrical body having a head adjacent one end, and a bore extending through said head and into said body adapted to receive a stud member therein, said bore having a transverse diameter less than the diameter of the stud, said body having a rebate portion adjacent the head reduced in thickness, said reduced rebate portion being formed by an annular groove in said body adjacent said bore having its upper peripheral extremity spaced inwardly from the end of said bore adjacent said head and substantially aligned with the underside of said head, said rebate portion having a height generally equal to the thickness of said panel and said body having an external diameter greater than the diameter of the aperture, said panel compressibly engaging and deforming the material of said body adjacent said rebate portion to form a shoulder on the exterior of said body when said body and said stud are in the finally applied position, said shoulder cooperating with said head to retain said body in position on said panel, and said body including at least one internal channel disposed adjacent said bore and extending axially through said head and into said body forming a vent for said body.

2. A fastening device according to claim 1, wherein the head comprises a flange which is adapted to bear against said panel.

3. A fastening device according to claim 1, wherein the diameter of the stud exceeds the diameter of the bore but wherein the diameter of the stud is less than the diameter of the rebate portion in the final applied position.

4. A fastening device adapted for securing an article to an apertured panel, said device comprising a cylindrical body having a head adjacent one end, and a bore extending through said head and into said body adapted to receive a stud member therein, said bore having a transverse diameter less than the diameter of said stud, said body having a rebate portion adjacent the head reduced in thickness, said reduced portion being formed by an annular groove in said body adjacent said bore and having its upper peripheral extremity spaced inwardly from the end of said bore adjacent said head and aligned with the underside of said head, said rebate portion having a height generally equal to the thickness of said panel and said body having an external diameter greater than the diameter of the aperture in said panel, said panel compressibly engaging the material of said body adjacent said rebate portion to form a shoulder on the exterior of said body when said body and said stud are in the finally applied position, and said shoulder cooperating with said head to retain said body in position on said panel.

5. A fastening device in accordance with claim 4, wherein said body is closed at the end remote from said head, and wherein said body includes an axially extending channel communicating interiorly with the bore and rebate portion for venting the bore to the exterior of said device.

6. A fastening device in accordance with claim 4, wherein said head includes an outwardly projecting flange, and wherein the upper annular periphery of said rebate portion is disposed substantially in the general plane of the undersurface of said flange.

7. A fastening device in accordance with claim 4, wherein the internal diameter of said rebate portion is greater than the internal diameter of said bore prior to insertion of said stud member into said bore and after its insertion in the final installed position of said device.

References Cited

UNITED STATES PATENTS

| | | | |
|---|---|---|---|
| 2,849,201 | 8/1958 | Schelgunov | 85—82 |
| 2,933,794 | 4/1960 | Biesecker | 85—82 |
| 3,203,304 | 8/1965 | Rapata | 85—83 |
| 3,205,760 | 9/1965 | Seckerson et al. | 85—82 |

FOREIGN PATENTS

| | | |
|---|---|---|
| 1,253,924 | 1/1961 | France. |
| 907,232 | 10/1962 | Great Britain. |

MARION PARSONS, Jr., *Primary Examiner.*